United States Patent Office 3,482,989
Patented Dec. 9, 1969

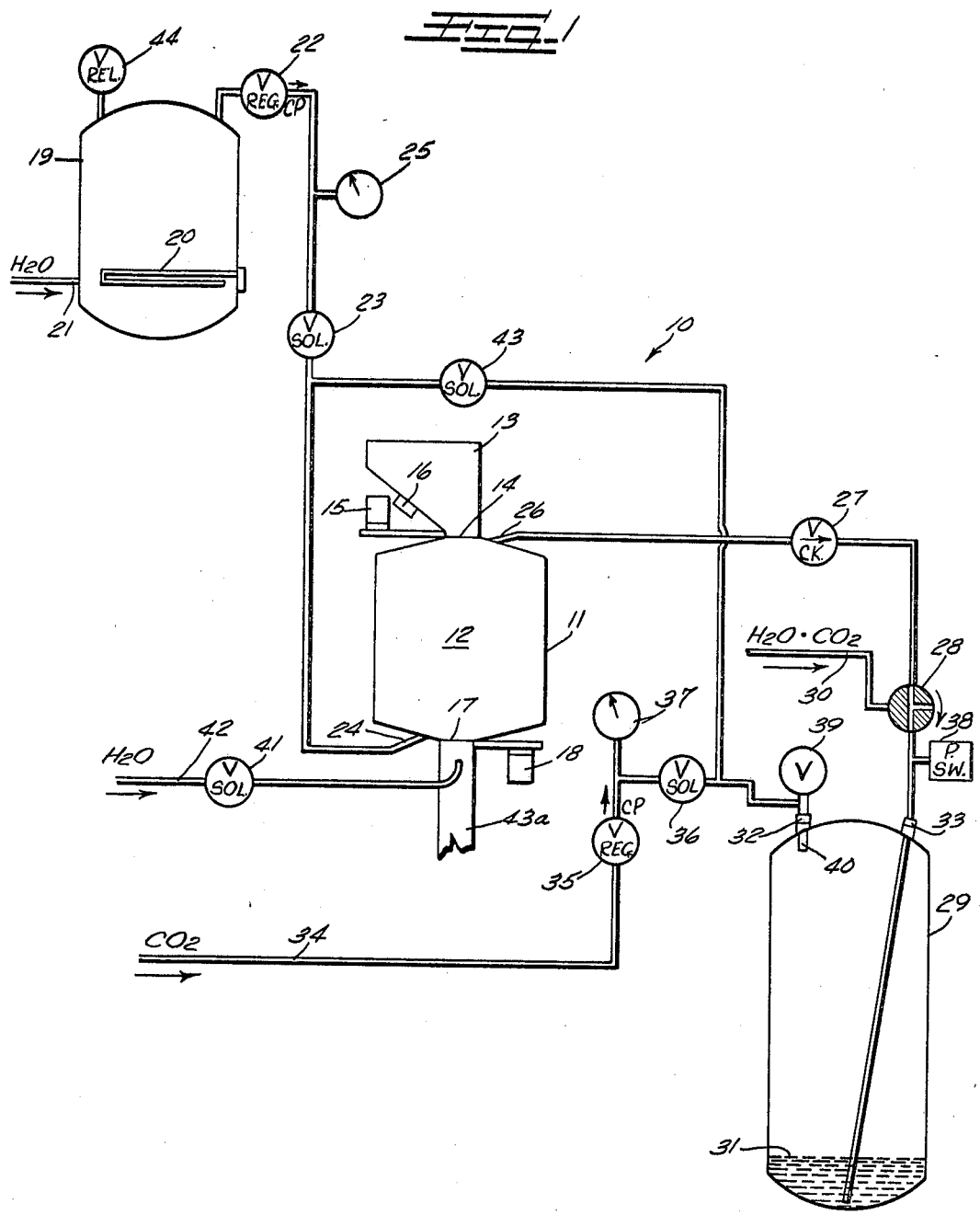

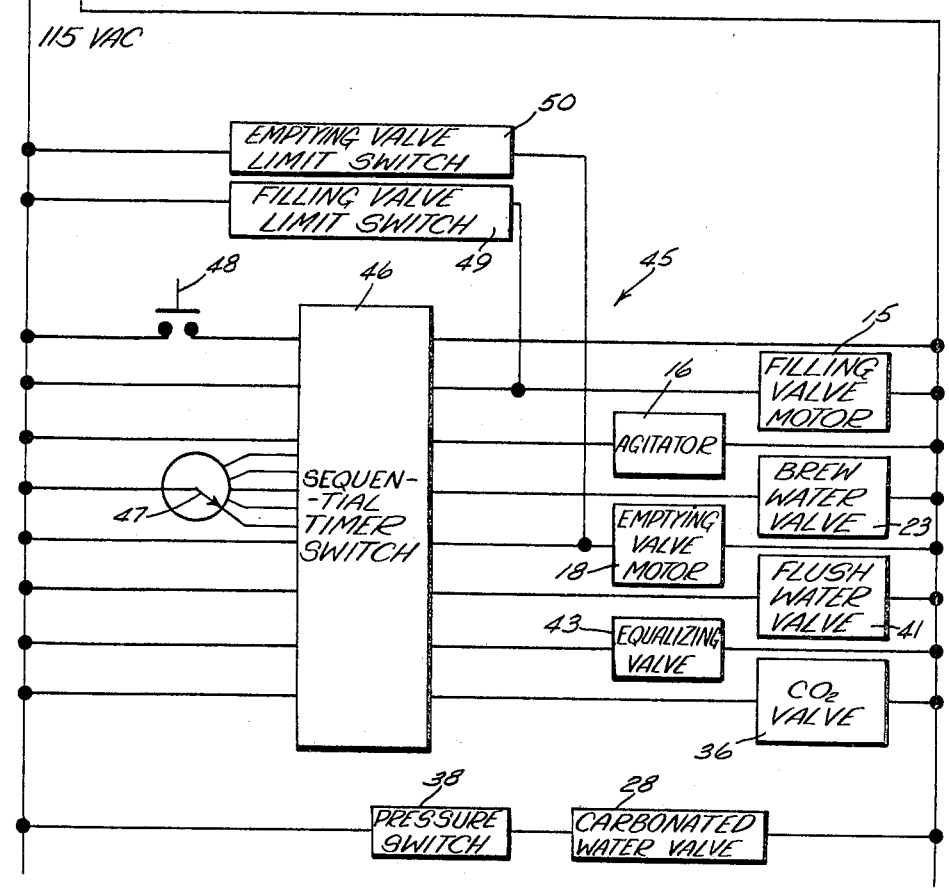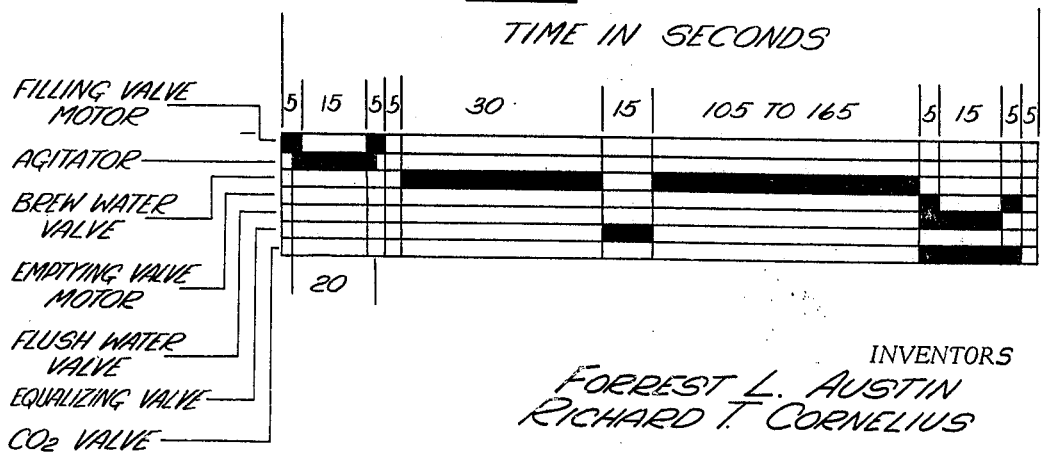

3,482,989
METHOD FOR BREWING COFFEE BEVERAGE
Forrest L. Austin, Brooklyn Center, and Richard T. Cornelius, Minneapolis, Minn., assignors to The Cornelius Company, Anoka, Minn., a corporation of Minnesota
Filed Sept. 17, 1965, Ser. No. 488,070
Int. Cl. A23f 1/08
U.S. Cl. 99—71                                17 Claims

ABSTRACT OF THE DISCLOSURE

A method for making successive batches of coffee infusions of uniform strength includes by means of a constant pressure, forcing water through a chamber of a fixed size that is filled with roasted ground coffee, such water flowing therethrough for a fixed elapsed period of time irrespective of the quantity of water that actually flows therethrough, and adding additional fresh water directly to the water that has flowed through the ground coffee in an amount necessary to dilute the same to a fixed volume. To break up channeling, the flow of water is interrupted relatively early and pressure is relieved after which the flow is resumed.

---

This invention relates generally to a method for brewing coffee beverage, and more specifically to a method which may be employed in connection with the commercial brewing of the same. Although the principles of the present invention may be included in various types of coffee brewing apparatus, a particularly useful application is made in a brewing apparatus of the type that is constructed to be employed repetitively in the high-volume production of coffee beverage.

Heretofore, when a large amount of coffee beverage was needed, a battery of large urns was employed, it taking up to an hour for each urn in such battery of urns to produce a batch of coffee beverage. A need has now arisen for a much larger quantity of coffee beverage to be brewed, and in less time than was previously possible. Moreover, it is desirable that when needed, the resulting beverage be preserved by carbonation for extended storage prior to future use.

Accordingly, it is an object of the present invention to provide a method for brewing coffee beverage from roasted and ground coffee beans.

A further object of the present invention is to provide a method for brewing coffee beverage wherein successive batches are virtually alike in taste and quality.

A still further object of the present invention is to provide a method for brewing coffee beverage of such simplicity that the same may readily be practised by persons of low skills, and that may readily be carried out by automatic controls.

Another object of the present invention is to provide a method for brewing preserved coffee beverage.

Yet another object of the present invention is to provide a method for brewing coffee beverage without any loss of aroma.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a diagram of apparatus which may be employed to brew a coffee beverage in accordance with the principles of the present invention;

FIG. 2 is an electrical diagram of a control system for automating the apparatus of FIG. 1; and FIG. 3 is a time-chart illustrating the operation of the control system of FIG. 2.

As shown on the drawings:

The principles of this invention are particularly useful when embodied in a coffee brewing system such as illustrated in FIG. 1, generally indicated by the numeral 10. The system 10 includes a housing 11 having a pressurizable chamber 12 of predetermined size which is substantially filled with dry ground coffee beans from a hopper or funnel 13. Ingress of ground coffee to the chamber 12 is controlled by a valve plate 14 which can be reciprocated by a motor 15. Ingress may be assisted by means of some assisting means such as a vibrator 16 acting on the funnel or hopper 13. A similar valve plate 17 under the control of a similar motor 18 closes the lower end of the chamber 12. In filling the chamber 12, it is desirable that it be substantially filled, leaving very little of it unfilled, so that any unfilled portion will become filled due to subsequent expansion of wet ground coffee.

A water heater 19 having a heating element 20 is provided which has a size sufficient to keep up with the intended production rate (not shown to scale in the drawing), and the heater 19 is connected to a source of suitable water 21, such water having been previously treated if necessary. The water heater 19 is continually operated, and may contain more water than is necessary for one batch.

The volumetric size of the chamber 12 defines the amount of ground roasted coffee to be employed in each batch of coffee beverage. By way of example, assuming that the batch size is 5 gallons, the volumetric size of the chamber 12 should be such as to receive between one and one-half and two pounds of dry roasted coffee. The actual amount of dry roasted coffee, within this range, which will be employed, is dependent upon the brand selected, as the roasts, grinds, and preferences vary to some extent. Using a typical high-quality type of ground coffee, the predetermined volume of the chamber 12 for a 5-gallon batch should be 1%6 pounds.

The heater 19, in the example given in the previous paragraph, should have sufficient capacity to raise the temperature of incoming water to the brewing temperature at the rate of about one and one-half gallons during each 4-minute period. Such capacity will insure that the system may be employed continuously to make successive 5-gallon batches of coffee beverage in accordance with this invention.

The water that is discharged from the heater 19 passes through a constant pressure regulator valve 22 under the control of a solenoid valve 23 to the inlet 24 of the chamber 12, which inlet preferably is at the bottom of such chamber. The pressure regulator valve 22 is usually set to about 25 p.s.i. as indicated on a gauge 25, but this setting may be as low as 15 or as high as 60 p.s.i. depending upon the shape of the bed of coffee disposed within the chamber 12.

The treated water from the source 21 is under pressure, the pressure being higher than the setting of the pressure regulator valve 22. In the event that a still higher output pressure is needed, a booster pump (not shown) may be inserted in the system.

In accordance with this invention, a relatively low temperature is employed for the water which enters the inlet fitting 24. This temperature falls within the range of 170 to 190 F., and a temperature of 180 F. is typical. The temperature of the water at the inlet 24 gradually decreases as it passes through the bed of ground coffee in the chamber 12. In passing through the chamber 12, the water takes into solution various solubles from the ground coffee beans, thereby forming an infusion therewith which passes through an outlet 26 disposed at the upper end of the chamber 12, and thence through a check valve 27, a solenoid-operated three-way valve 28, and into a storage tank 29.

Expressions such as "strength of coffee" and "strong coffee" are commonplace, but are ambiguous. In reality, there is both a physical or chemical strength and a separate taste strength. The physical or chemical strength is easily measurable by means of a hydrometer. The solubles that provide this property come out of the ground coffee beans at relatively low temperatures, such as those used herein. The more difficult solubles to extract require a temperature closer to boiling, and a longer time to extract, and these may be referred to collectively as bitter-tasting oils. In conventional pot-brewing, the brewing process must be arrested when such quantity of the bitter oils has been removed as imparts the maximum "strength" or bitterness that the consumer will tolerate. However, in such brewing, there still remains a considerable quantity of other extractible material in the coffee beans which would be useful to create the chemical or physical strength referred to. Using the time-durations and other parameters set forth herein, there is a maximum of extraction of these solubles which impart physically-measurable chemical strength to the infusion. In addition to a high-level of extraction of such solubles, the process also includes the extraction of a restricted amount of bitter oils to impart to such "strong coffee," the "strength of taste" which may be desired. Suitable recognition of the foregoing findings enables the production of coffee beverage at a somewhat greater yield than is ordinarily expected. It is estimated that the increase in yield obtained by this invention is thus between 7% and 33%, depending upon various factors.

When many batches of brewed coffee are to be produced, a uniformity of end result is desirable. We have found that a maximum uniformity can be obtained if the time that water is allowed to flow through the chamber 12 is closely regulated. With constant pressure, various quantities of water actually flow through the chamber 12 for successive batches. Depending upon circumstances, the amount that flows through may be as low as ¼ gallon and as high as 1½ gallons in a 3-minute period. However, even when all of the parameters are maintained the same, the inherent differences between the successive beds of coffee of like grind and blend still produce a variation in the amount of water that will pass therethrough during a fixed period, which variation may be as much as ¼ gallon. Thus where ¾ gallon may be an average amount of water that flows through in a fixed period of time, that amount of water may be as little as ½ and may be as much as 1 gallon. This amount that flows through, having therein the various solubles extracted from the coffee beans, comprises an intermediate product which is not truly an extract, concentrate, or syrup as those terms have come to denote within the preserved-coffee art, and therefore, the same has been referred to herein as being an "intermediate product." The process thus provides that the total flow or extraction time may be as little as 2¼ minutes, and as much as 4¼ minutes. Typically, a choice is made within this range, for example 2½ minutes, 2¾ minutes, or 3 minutes. One of these typical extraction times is employed for successive batches, and yet the volumetric yield of intermediate product varies. Notwithstanding such variation, a quantity of water is thereafter added to the storage tank 29 without running the same through the coffee bed. If the amount of intermediate product obtained is ½ gallon, 4½ gallons of water is added, while if the volumetric amount of intermediate product obtained is 1 gallon, 4 gallons are added thereto. Even though one batch of intermediate product may thus be diluted twice as much as the other batch, the physical or chemical and taste strengths of the resulting beverage batches are uniform. It is thus emphasized that uniformity of time of extraction is somewhat more important than uniformity of amount of water employed in the extraction, this result being based upon the fact that the quantity of intermediate product obtained is in neither instance saturated with solubles extracted from the ground coffee beans, and hence the term "unsaturated intermediate product" is used herein to define such yield, and the term "unsaturated variable strength intermediate product" is used herein to define the nature of successive yields.

If the ultimate product is to be consumed within a few hours, the dilution may be effected by means of any suitable water. However, if the ultimate product is to be preserved for several days or weeks before consumption, the dilution is accomplished by means of carbonated water. For this purpose, a source of pressurized carbonated water 30 is connected to the 3-way valve 28 which may be operated to direct such carbonated water to the tank 29. Preferably the level of carbonation in the source 30 is such that the diluted product will have 2 to 4 volumes of carbon dioxide gas dissolved therein, a typical level of carbonation being 3½ volumes of $CO_2$. Since the intermediate product indicated at 31 in the tank will dilute or lower the carbonation of the incoming carbonated water, a proportionately higher level of carbonation is preferably employed in the incoming carbonated water.

To inject such carbonated water under pressure, a clean empty tank 29 initially is connected by means of self-sealing quick-disconnect couplings 32, 33 to the coffee brewing system. A source of carbon dioxide gas 34 is connected to a constant pressure regulator valve 35 through a solenoid valve 36 to discharge carbon dioxide gas into the tank 29 through the fitting 32. The constant pressure regulator valve 35 is typically set to a pressure of 60 p.s.i. as indicated by a gauge 37. The tank 29 is thus purged with carbon dioxide gas by this equipment, or may be so purged previously to being connected thereto. It is preferable that the pressure at this point in the tank 29 be substantially atmospheric.

The system from the chamber 12, through the check valve 27 to the tank 29 is normally a closed system, thereby precluding any loss of aroma in the process.

Subject to an optional intermediate step described below the extraction water is caused to flow through the coffee bed in the chamber 12 to the tank 29 for a fixed period of time falling within the range 2¼ to 3¼ minutes. The valve 23 is then closed to stop flow of such water and the $CO_2$ valve 36 is opened to thereby pressurize space in the tank 29 above the intermediate product 31. The pressure in this space will ultimately rise to the setting of the pressure regulator valve 35 as indicated by the gauge 37, which as indicated, will be typically 60 p.s.i. Shortly before that pressure is reached, the pressure in the tank 29 will actuate a pressure switch 38 which is connected to the solenoid of the 3-way valve 28 to connect the source of carbonated water 30 to the tank 29. The source 30 is at a higher pressure and reverse flow to the chamber 12 is precluded by the check valve 27. The tank 29 is provided with a snifter valve 39 of known construction which gradually bleeds off the carbon dioxide gas above the liquid in the tank 29 until the level of the liquid reaches the lower end 40 thereof tending to cause coffee to be vented. However, such liquid coffee closes a small float valve therein (not shown) which forms a part of the snifter valve to preclude further venting. At this point, the quick disconnect couplings 32, 33 may be manually separated from the tank 29 and a fresh tank attached. After breaking of the coupling 33, the pressure switch 38 reopens to effect repositioning of the 3-way valve 28 to the illustrated position.

At the same time that the solenoid valve 36 is energized to pressurize the tank 29, the motor 18 is energized to open the gate valve 17, and a flush water valve 41 is also energized. The flush water valve 41 is connected to a source of cold water 42 which directs flushing water through the open valve 17 to flush out all the spent grounds in the chamber 12, and down through a waste pipe 43a. The flush water valve 41 is then closed and the motor 18 is again actuated to reclose the valve 17.

An optional feature of this invention is that the extraction portion of the cycle may be deliberately interrupted when it is from 8 to 33% complete, and during such interruption, the pressure at the inlet 24 is relieved for a few moments, after which the extraction cycle is resumed and completed. A typical duration of such interruption is about ¼ minute, and this interruption typically is made after about ½ minute of the extraction time has passed. The period of interruption is not included in computing the duration of time in which extraction water is caused to flow through the brewing chamber 12. More specifically, the pressure at the inlet 24 is vented through an equalizing valve 43 to the tank 29 which is substantially at the pressure of the outlet fitting 26. This equalizing step is provided for the following reason. When the flow of heated water is initiated through the water inlet fitting 24, that water ordinarily wets the entire bed of ground coffee which forms a uniform filter bed through all of which the water passes. Occasionally, in a very small number of batches, owing to the unpredictable nature of ground coffee, a channel may develop in the coffee bed which may short-circuit a major portion of the bed, thereby unduly increasing the amount of water which would flow therethrough while decreasing the amount of solubles that are extracted. Such channeling may be self-correcting, but before there has been such adequate correction, an excessive amount of water may have passed through to the tank 29, thereby upsetting the degree of carbonation of the resulting diluted product that fills the entire tank 29. We have found that by interrupting the flow of extraction water for a few moments shortly after the extraction step has begun, and by relieving the pressure at the inlet 24, a bed having such channeling tends to shift due to the effect of gravity and due to the transient effect of the sudden loss of pressure. This internal shift of the bed consistently destroys any channeling which may be present therein, thus assuring that a uniform amount of solubles will be extracted during the fixed period of extraction. Note that there is no reverse flow in a true sense, as such is precluded by the check valve 27. However, there is a momentary shift due to equalization of pressures which is accomplished suddenly.

If desired, a relief valve 44 may be employed on the water heater 19.

Cold water is employed in the source 42 so that the freshly flushed moist interior of the chamber 12, which has been cooled by such water, will not give off any substantial amount of vapor which could pass up into the hopper 13 when the valve 14 is shortly thereafter reopened.

Fresh coffee grounds contain carbon dioxide gas which is driven off when heat is applied. Some such gas is present thus in the chamber 12, which natural aromas or gases are thus also vented to the tank 29. The opening of the equalizing valve 43 creates a gurgling surge momentarily, by which pressure is removed from the lower side of the bed enabling gravity to settle the wet grounds, which being wetted, will not rechannel.

The various components described in the system of FIG. 1 may be interconnected by a control system or circuit shown in FIG. 2 and generally indicated by the numeral 45. The circuit 45 includes leads $L_1$ and $L_2$ which may be connected to a suitable source of power, and across which the various loads are connected. The heart of the circuit is a sequential timer switch 46 having a selector knob 47 which may be positioned in various positions to select the duration of the second portion of the extraction step which may thus comprise sub-intervals, e.g. 1¾ minutes, 2 minutes, 2¼ minutes, 2½ minutes and 2¾ minutes. The timer motor (not shown) is energized by a cycle-initiating switch 48 so as to actuate various cam-actuated switches in a predetermined sequence. First the filling valve motor 15 is energized, and as it begins to rotate, it closes a filling valve limit switch 49 in parallel with the sequential timer switch 46, the timer switch being opened before the valve motor shuts itself off by engaging the switch 49. Shortly after the filling valve motor 15 has begun to move in a valve-opening direction, the agitator 16 is energized by the timer switch 46. After enough time has elapsed for the chamber 12 to fill, the filling valve motor 15 is again reenergized to reclose the filling valve limit switch 49 which serves as a holding circuit as described before until the filling valve 14 is fully closed. Thereafter, the brew water valve 23 is energized for a typical period of ½ minute, after which it may optionally be deenergized and the equalizing valve 43 be simultaneously energized for a few moments, such as for ¼ minute. At the end of any such optional interruption of extraction, the equalizing valve 43 is deenergized and the brew water valve 23 is reenergized for the remainder of the fixed selected period. At this point, the emptying valve motor 18 is energized through the timer and the flush water valve 41 is energized, as is also the carbon dioxide gas valve 36. The emptying valve motor 18 is kept operating since its initial movement closes an emptying valve limit switch 50, and such movement continues until the emptying valve motor 18 reopens the switch 50. On completion of the flushing, the flush water valve 41 is closed, and the emptying valve motor 18 is again reenergized through the timer 46 until it breaks the circuit through the limit switch 50 a second time. The $CO_2$ valve 36 is allowed to remain energized for such period of time as is needed to build up the pressure in the tank 29 to a level where the pressure closes the pressure switch 38, and then the timer 46 shuts the $CO_2$ valve 36 off. The energizing of the pressure switch 38 closes the circuit to the carbonated water valve which thus admits carbonated water to the tank 29 subject to the operation of the snifter valve 39.

Thus by the control of extraction time while allowing only a portion of the total liquid to pass through the coffee grounds, a high degree of uniformity of successive batches is maintained while obtaining a high degree of extraction in a minimum amount of time. Thus also such uniformity may be insured by the optional interruption of the extraction cycle to enable break-up of any channeling which may have initiated in the closely confined bed.

We claim as our invention:
1. A method for making batches of uniform coffee infusions from roasted ground coffee and water, comprising in combination:
   (a) for each batch, substantially filling a pressurized chamber of fixed size with roasted ground coffee;
   (b) by means of a constant pressure, which is the same for each such batch, forcing pressurized water to flow through said ground coffee for a fixed elapsed period of time which is the same for each such batch and which is of sufficient duration to produce a quantity of an intermediate product having a concentration less than that of the first such product to flow through; and
   (c) adding such amount of additional fresh water directly to said quantity of intermediate product as is necessary to dilute each batch to a fixed volume which is the same for each such batch.

2. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, forcing any amount of pressurized water through said ground coffee which will pass therethrough during a fixed elapsed period of time which is the same for each such batch and which is of sufficient duration to produce a quantity of a variable strength intermediate product having a concentration less than that of the first such product to flow through; and
   (c) adding such amount of additional fresh water directly to said quantity of intermediate product as is necessary to dilute each batch to a fixed volume which is the same for each such batch.

3. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, forcing such amount of pressurized water through said ground coffee as will pass therethough during a fixed elapsed period of time which is the same for each such batch and which is of sufficient duration to produce a quantity of a variable strength intermediate product having a concentration less than that of the first such product to flow through; and
   (c) adding such amount of additional fresh water directly to said quantity of intermediate product as is necessary to dilute each batch to a fixed volume which is the same for each such batch.

4. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, forcing pressurized water through said ground coffee for a fixed elapsed period of time which is the same for each such batch and which is terminated before all the solubles have been extracted which are extractable for the temperature and pressure employed, said time being of sufficient duration to produce a quantity of an intermediate product having a concentration less than that of the first such product to flow through; and
   (c) adding such amount of additional fresh water directly to said quantity of intermediate product as is necessary to dilute each batch to a fixed volume which is the same for each such batch.

5. A method for making preserved batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, forcing pressurized water to flow through said ground coffee for a fixed elapsed period of time which is the same for each such batch and which is of sufficient duration to produce a quantity of an intermediate product having a concentration less than that of the first such product to flow through; and
   (c) adding, under pressure, such amount of fresh carbonated water directly to said quantity of intermediate product as is necessary to dilute each batch to a fixed volume which is the same for each such batch and which has 2 to 4 such volumes of carbon dioxide gas dissolved therein.

6. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, passing such amount of pressurized water, having an inlet temperature between 170 and 190° F., through said ground coffee as will pass therethrough during a fixed elapsed period of time which is the same for each such batch and which is of sufficient duration to produce a quantity of an intermediate product having a concentration less than that of the first such product to flow through; and
   (c) adding such amount of additional fresh water directly to said quantity of intermediate product as is necessary to dilute each batch to a fixed volume which is the same for each such batch.

7. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, passing such amount of pressurized water through said ground coffee as will flow therethrough during a fixed elapsed period of time which is the same for each such batch and which is of sufficient duration and falling substantially in the range of 2¼ to 4¼ minutes, to produce a quantity of an intermediate product having a concentration less than that of the first such product to flow through; and
   (c) adding such amount of additional fresh water directly to said quantity of intermediate product as is necessary to dilute each batch to a fixed volume which is the same for each such batch.

8. A method for making batches of uniform coffee infusion from roasted ground coffee and water, comprising in combination:
   (a) for each batch, substantially filling a pressurizable chamber of fixed size with roasted ground coffee;
   (b) by means of a constant inlet pressure of about 25 p.s.i., which is the same for each such batch, passing such amount of water, having an inlet temperature of about 180° F., through said ground coffee as will flow therethrough during a fixed elapsed period of time which is the same for each such batch and which is of sufficient duration and falling substantially in the range of 2¼ to 4¼ minutes, to produce a quantity of an intermediate product having a concentration less than that of the first such product to flow through; and
   (c) adding such amount of additional fresh water directly to said quantity of intermediate product as is necessary to dilute each batch to a fixed volume which is the same for each such batch.

9. A method for making batches of uniform coffee infusions from roasted ground coffee and water, comprising in combination:
   (a) for each batch, substantially filling a pressurizable chamber of fixed size with roasted ground coffee;
   (b) by means of a constant pressure, which is the same for each such batch, forcing between 5 and 30% of the ultimate amount of water to be used in the batch through said ground coffee in a fixed elapsed period of time which is the same for each such batch and which is of sufficient duration and falling substantially in the range of 2¼ to 4¼ minutes, to produce a quantity of an intermediate product having a concentration less than that of the first such product to flow through; and (c) diluting said quantity of intermediate product by adding the remainder of said ultimate amount of water as fresh water directly to each batch, said ultimate amount of water being the same for each batch.

10. A method for making batches of uniform coffee infusions from roasted ground coffee and water, comprising in combination:
  (a) for each batch, substantially filling a pressurizable chamber of fixed size with roasted ground coffee;
  (b) by means of a constant pressure, which is the same for each such batch, forcing between 10 and 20% of the ultimate amount of water to be used in the batch through said ground coffee in a fixed elapsed period of time which is the same for each such batch and which is of sufficient duration and falling substantially in the range of 2¼ to 4¼ minutes, to produce a quantity of an intermediate product having a concentration less than that of the first such product to flow through; and
  (c) diluting said quantity of intermediate product by adding the remainder of said ultimate amount of water as fresh water directly to each batch, said ultimate amount of water being the same for each batch.

11. A method for making batches of uniform coffee infusions from roasted ground coffee and water, comprising in combination:
  (a) substantially filling a pressurizable chamber of fixed size with roasted ground coffee;
  (b) by means of a constant pressure, forcing pressurized water to flow through said ground coffee for a fixed elapsed period of time of sufficient duration to produce a quantity of an intermediate product having a concentration less than that of the first such product to flow through;
  (c) interrupting said forcing of water when 8 to 33% of said period of time of flow of water has passed, and during such interruption, relieving the inlet pressure to said chamber, and then resuming said forcing of water; and
  (d) adding such amount of additional water directly to said quantity of intermediate product as is necessary to dilute the same to a fixed volume.

12. A method for making batches of uniform coffee infusions from roasted ground coffee and water, comprising in combination:
  (a) substantially filling a pressurizable chamber of fixed size with roasted ground coffee;
  (b) by means of a constant pressure forcing pressurized water to flow through said ground coffee for a fixed elapsed period of time of sufficient duration to produce a quantity of an intermediate product having a concentration less than that of the first such product to flow through;
  (c) interrupting said forcing of water when about 15 to 22% of said period of time of flow of water has passed, and during such interruption, relieving the inlet pressure to said chamber, and then resuming said forcing of water; and
  (d) adding such amount of additional water directly to said quantity of intermediate product as is necessary to dilute the same to a fixed volume.

13. A method for making batches of uniform coffee infusions from roasted ground coffee and water, comprising in combination:
  (a) substantially filling a pressurizable chamber of fixed size with roasted ground coffee;
  (b) by means of a constant pressure, passing such amount of pressurized water through said ground coffee as will flow therethrough during a fixed elapsed period of time, of sufficient duration and falling substantially in the range of 2¼ to 4¼ minutes, to produce a quantity of an intermediate product having a concentration less than that of the first such product to flow through;
  (c) interrupting said flow for about ¼ minute after about ½ minute of said period of time of water flow has passed, and during such interruption, relieving the inlet pressure to said chamber, and then resuming said flow; and
  (d) adding such amount of additional water directly to said quantity of intermediate product as is necessary to dilute the same to a fixed volume.

14. A method for making batches of uniform coffee infusions from roasted ground coffee and water, comprising in combination:
  (a) substantially filling a pressurizable chamber of fixed size with roasted ground coffee;
  (b) by means of a constant pressure, passing such amount of pressurized water through said ground coffee as will flow therethrough during a fixed elapsed period of time, of sufficient duration and falling substantially in the range of 2¼ to 4¼ minutes, to produce a quantity of an intermediate product having a concentration less than that of the first such product to flow through;
  (c) interrupting said flow for about ¼ minute after about ½ minute of said period of time of water flow has passed, and during such interruption, relieving the pressure drop across said chamber, and then resuming said flow; and
  (d) adding such amount of additional water directly to said quantity of intermediate product as is necessary to dilute the same to a fixed volume.

15. A method for making batches of uniform coffee infusions from roasted ground coffee and water, comprising in combination:
  (a) substantially filling a pressurizable chamber of fixed size with roasted ground coffee;
  (b) by means of a constant inlet pressure of about 25 p.s.i., passing such amount of water, having an inlet temperature of about 180 F., through said ground coffee as will flow therethrough during a fixed elapsed period of time, of sufficient duration and falling substantially in the range of 2¼ to 4¼ minutes, to produce a quantity of an intermediate product having a concentration less than that of the first such product to flow through;
  (c) interrupting said flow for about ¼ minute after about ½ minute of said period of time of water flow has passed, and during such interruption, relieving the pressure drop across said chamber, and then resuming said flow; and
  (d) adding such amount of additional water directly to said quantity of intermediate product as is necessary to dilute the same to a fixed volume.

16. A method for making batches of uniform coffee infusions from roasted ground coffee and water, comprising in combination:
  (a) substantially filling a pressurizable chamber of fixed size with roasted ground coffee;
  (b) by means of a constant inlet pressure of about 25 p.s.i., passing such amount of water, having an inlet temperature of about 180 F., through said ground coffee as will flow therethrough during a fixed elapsed period of time, of sufficient duration and falling substantially in the range of 2¼ to 4¼ minutes, to produce a quantity of an intermediate product having a concentration less than that of the first such product to flow through; and
  (c) adding such amount of additional water directly to said quantity of intermediate product as is necessary to dilute the same to a fixed volume.

17. A method for making batches of uniform coffee infusions from roasted ground coffee and water, comprising in combination:
  (a) substantially filling a pressurizable chamber of fixed size with roasted ground coffee;

(b) by means of a constant pressure, forcing pressurized water to flow through said ground coffee for a fixed elapsed period of time of sufficient duration to produce a quantity of an intermediate product having a concentration less than that of the first such product to flow through;
(c) conducting such intermediate product through a closed system to a closed tank; and
(d) adding such amount of additional water through the closed system directly to said quantity of intermediate product as is necessary to dilute the same to a fixed volume.

References Cited

UNITED STATES PATENTS

| | | | |
|---|---|---|---|
| 2,236,059 | 3/1941 | Heuser | 99—71 |
| 3,261,507 | 7/1966 | Cornelius | 222—146 |

MAURICE W. GREENSTEIN, Primary Examiner

U.S. Cl. X.R.

99—302, 303